United States Patent
Innocenti et al.

(10) Patent No.: US 10,954,822 B2
(45) Date of Patent: Mar. 23, 2021

(54) REPAIR MEMBER FOR A VANE ASSEMBLY OF A GAS TURBINE AND METHOD FOR REPAIRING A DAMAGED VANE OF A VANE ASSEMBLY OF A GAS TURBINE

(71) Applicant: Nuovo Pignone Tecnologie Srl, Florence (IT)

(72) Inventors: Mirco Innocenti, Scandicci (IT); Marco Boncinelli, Signa (IT); Stefania Stramare, Florence (IT); Carlo Giolli, Florence (IT); Davide Lazzarato, Asti (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 178 days.

(21) Appl. No.: 16/077,384

(22) PCT Filed: Mar. 15, 2017

(86) PCT No.: PCT/EP2017/056143
§ 371 (c)(1),
(2) Date: Aug. 10, 2018

(87) PCT Pub. No.: WO2017/158037
PCT Pub. Date: Sep. 21, 2017

(65) Prior Publication Data
US 2019/0218938 A1    Jul. 18, 2019

(30) Foreign Application Priority Data
Mar. 16, 2016    (IT) .................... 102016000027545

(51) Int. Cl.
*B23P 6/00* (2006.01)
*F01D 5/00* (2006.01)
(Continued)

(52) U.S. Cl.
CPC .............. *F01D 25/28* (2013.01); *B23P 6/005* (2013.01); *F01D 5/005* (2013.01); *F01D 5/186* (2013.01);
(Continued)

(58) Field of Classification Search
CPC ....... F01D 5/005; F05D 2230/80; B23P 6/005
See application file for complete search history.

(56) References Cited

U.S. PATENT DOCUMENTS 3,650,635 A * 3/1972 Wachtell .............. B22D 27/045
                                                         415/115
4,305,697 A * 12/1981 Cohen .................... B23P 6/005
                                                         29/402.13
(Continued)

FOREIGN PATENT DOCUMENTS

EP    2781691 A1    9/2014
RU    2008438 C1    2/1994
(Continued)

OTHER PUBLICATIONS

Search Report and Written Opinion issued in connection with corresponding IT Application No. 102016000027545 dated Nov. 3, 2016 (English Translation not available).
(Continued)

*Primary Examiner* — Christopher M Koehler
(74) *Attorney, Agent, or Firm* — Baker Hughes Patent Org.

(57) ABSTRACT

The repair member includes an inner platform, an outer platform portion, and an airfoil portion connecting the inner and outer platform portions; the inner platform portion is configured so to reach an edge of a first ring or sector of ring of a vane assembly of the damaged vane, and the outer platform portion is configured so to reach an edge of a second ring or sector of ring of the a vane assembly of the
(Continued)

damaged vane; the inner platform portion, the outer platform portion, and the airfoil portion are configured so to allow insertion of the repair member into the vane assembly by a pure translation movement being along an insertion direction and having a movement component parallel to an axes of the first and second rings or sectors of ring.

11 Claims, 11 Drawing Sheets

(51) Int. Cl.
    *F01D 25/28* (2006.01)
    *F01D 9/04* (2006.01)
    *F01D 5/18* (2006.01)

(52) U.S. Cl.
    CPC ............. *F01D 5/187* (2013.01); *F01D 9/041* (2013.01); *F01D 9/044* (2013.01); *F05D 2220/32* (2013.01); *F05D 2230/14* (2013.01); *F05D 2230/237* (2013.01); *F05D 2230/80* (2013.01); *F05D 2240/122* (2013.01); *F05D 2240/80* (2013.01)

(56) References Cited

U.S. PATENT DOCUMENTS

| | | | | |
|---|---|---|---|---|
| 4,326,833 A * | 4/1982 | Zelahy | ................... | B23P 6/005 29/402.13 |
| 4,805,282 A | 2/1989 | Reaves et al. | | |
| 4,842,663 A * | 6/1989 | Kramer | ................... | B23P 6/005 156/153 |
| 2005/0102835 A1 * | 5/2005 | Trewiler | ................. | F01D 5/005 29/889.1 |
| 2009/0252987 A1 * | 10/2009 | Greene, Jr. | ........ | G01N 29/2431 428/678 |
| 2010/0050435 A1 * | 3/2010 | Ahmad Zainuddin | .... | F01D 5/20 29/889.1 |
| 2011/0099810 A1 * | 5/2011 | Stankowski | ............ | B23P 6/005 29/888 |
| 2011/0299982 A1 * | 12/2011 | Wulf | ....................... | B23P 6/002 415/208.1 |
| 2015/0321250 A1 * | 11/2015 | Xu | ......................... | B23K 37/00 164/15 |
| 2016/0069185 A1 * | 3/2016 | Stankowski | ....... | B23K 26/0006 29/889.1 |
| 2016/0376893 A1 * | 12/2016 | Hardwicke | ........... | F01D 25/246 156/249 |
| 2017/0198584 A1 * | 7/2017 | Eminoglu | ............... | F01D 5/005 |
| 2018/0010457 A1 * | 1/2018 | Chabane | ................. | F01D 5/005 |
| 2018/0010458 A1 * | 1/2018 | Chabane | ................. | F01D 5/14 |

FOREIGN PATENT DOCUMENTS

| | | |
|---|---|---|
| RU | 2173389 C2 | 9/2001 |
| RU | 2186260 A | 7/2002 |

OTHER PUBLICATIONS

International Search Report and Written Opinion issued in connection with corresponding PCT Application No. PCT/EP2017/056143 dated May 17, 2017.

International Preliminary Report on Patentability issued in connection with corresponding PCT Application No. PCT/EP2017/056143 dated Sep. 18, 2018.

* cited by examiner

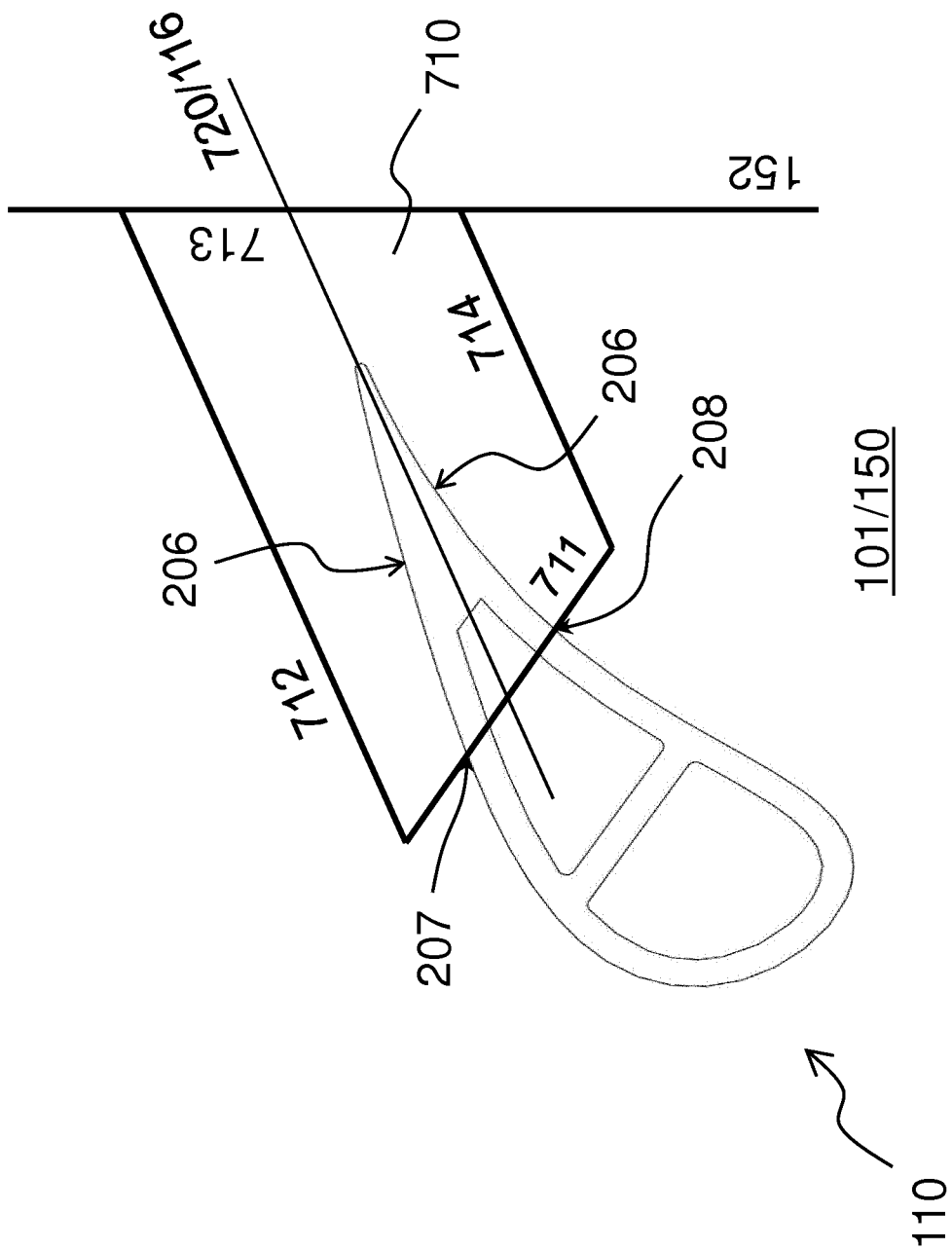

REPAIR MEMBER FOR A VANE ASSEMBLY OF A GAS TURBINE AND METHOD FOR REPAIRING A DAMAGED VANE OF A VANE ASSEMBLY OF A GAS TURBINE

FIELD OF THE INVENTION

Embodiments of the subject matter disclosed herein correspond to repair members for vane assemblies of gas turbines and methods for repairing damaged vanes of vane assemblies of gas turbines.

BACKGROUND OF THE INVENTION

Vanes (i.e. statory aerodynamic components) of gas turbines are subject to damages during operation of the gas turbines. Damages are generally due to mechanical stresses and/or thermal stresses.

This is particularly true in the field of Oil & Gas as the machines used in this field are heavy-duty.

The trailing edges of the vanes are particularly vulnerable to damages as they are thin.

Furthermore, the trailing edges are particularly vulnerable to damages when multiple holes, for example cooling holes, are located in these regions.

U.S. Pat. No. 4,305,697 discloses a solution for repairing the leading edges of vanes of gas turbines (i.e. statory components of the turbines).

According to this solution, the vanes are comprised in a vane assembly, the vane assembly comprises an inner platform in the form of a first sector of ring and an outer platform in the form of a second sector of ring and a plurality of vanes. As it is apparent from the figures, according to this solution, a repair member may only be inserted in the vane assembly along a radial direction.

According to this solution, inserting the repair member requires very precise horizontal ("horizontal" considering the figures of U.S. Pat. No. 4,305,697—"tangential" considering the axis of the rotary machine) movements of the repair member with respect to the vane assembly; in fact, the repair member should be positioned in perfect horizontal alignment with a small upper hole.

According to this solution, positioning the repair member require very precise vertical ("vertical" considering the figures of U.S. Pat. No. 4,305,697—"radial" considering the axis of the rotary machine) movements of the repair member with respect to the vane assembly; in fact, the repair member should be positioned in perfect horizontal alignment with the surfaces of the vane to be repaired. If the solution of U.S. Pat. No. 4,305,697 would be used for repairing trailing edges of vanes with multiple holes (instead of leading edges), vertical positioning precision would be even more critical as any hole should be perfectly aligned with the end of the corresponding feeding conduit.

U.S. Pat. No. 4,305,697 discloses a solution for repairing the leading edges or trailing edges of blades of gas turbines (i.e. rotary components of the turbines).

According to this solution, the blades are presumably comprised in a blade assembly (not shown in the figures); the bases of the blades are used for fixing the blades while the tips of the blades are loose. As it is apparent from the figures, in particular FIG. 2, the repair member does not comprise any platform portion of the assembly either at the base region of the blade and, even less, at the tip region of the blade; the repair member simply consists in an airfoil portion (see FIG. 2). Furthermore, the repair member may be taken to the blade to be repaired along any direction; therefore, positioning the repair member require very precise vertical and horizontal movements of the repair member with respect to the blade.

SUMMARY OF INVENTION

Therefore, there is a general need for improving the methods of repairing vanes assemblies of gas turbines, in particular for making such methods easier.

A specific need exists when damages are located in the regions of the trailing edges of the vanes.

These needs are particularly high for gas turbines used in the field of "Oil & Gas", i.e. machines used in plants for exploration, production, storage, refinement and distribution of oil and/or gas.

First embodiments of the subject matter disclosed herein relate to repair members for vane assemblies of gas turbines.

According to such first embodiments, in a repair member for a vane assembly of a gas turbine, the vane assembly comprises an inner platform in the form of a first ring or sector of ring, an outer platform in the form of a second ring or sector of ring, and a plurality of vanes each consisting of a leading edge portion, a trailing edge portion and a body portion; the repair member is arranged for repairing a damaged vane of said plurality of vanes, and comprises:
   an inner platform portion designed to replace part of the inner platform of said damaged vane,
   an outer platform portion designed to replace part of the outer platform of said damaged vane, and
   an airfoil portion connecting said inner and outer platform portions, designed to replace a leading edge portion or a trailing edge portion of said damaged vane;
   said inner platform portion is configured so to reach an edge of said first ring or sector of ring,
   said outer platform portion is configured so to reach an edge of said second ring or sector of ring, and said inner platform portion, said outer platform portion, and said airfoil portion are configured so to allow insertion of the repair member into the vane assembly by a pure translation movement being along an (more particularly, only one) insertion direction and having a movement component parallel to an axis of said first and second rings or sectors of ring.

Second embodiments of the subject matter disclosed herein relate to methods for repairing damaged vanes of vane assemblies of gas turbines.

According to such second embodiments, in a method for repairing a damaged vane of a vane assembly of a gas turbine, the vane assembly comprises an inner platform in the form of a first ring or sector of ring, an outer platform in the form of a second ring or sector of ring, and a plurality of vanes each consisting of a leading edge portion, a trailing edge portion and a body portion; the method comprising:
A) providing a repair member comprising an inner platform portion, an outer platform portion and an airfoil portion connecting said inner and outer platform portions,
B) removing from a vane region of said damaged vane of said plurality of vanes material corresponding to the shape of said repair member so to create a space for said repair member,
C) inserting said repair member into said space by a pure translation direction movement being along an (more particularly, only one) insertion direction and having a movement component parallel to an axis of said first and second rings or sectors of ring, and
D) fixing said repair member to said vane assembly;

B is a part of said inner platform is removed and an inner guide is created, and a part of said outer platform is removed and an outer guide is created, and C said repair member is inserted by sliding said inner platform portion along said inner guide and said outer platform portion along said outer guide.

BRIEF DESCRIPTION OF THE DRAWINGS

The accompanying drawings, which are incorporated herein and constitute an integral part of the present specification, illustrate exemplary embodiments of the present invention and, together with the detailed description, explain these embodiments. In the drawings:

FIG. 9 shows a cross-section view of a first embodiment of a repaired vane.

DETAILED DESCRIPTION

The following description of exemplary embodiments refers to the accompanying drawings.

The following description does not limit embodiments of the invention. Instead, the scope of embodiments of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In a gas turbine, statoric vanes are grouped in one or more sets. The vanes of each set are arranged in one ring and are belong to one or more vane assemblies. In case of only one vane assembly, the vane assembly covers an angle of 360°. In case of N vane assemblies, each vane assembly covers and angle of 360°/N.

Figure 1:
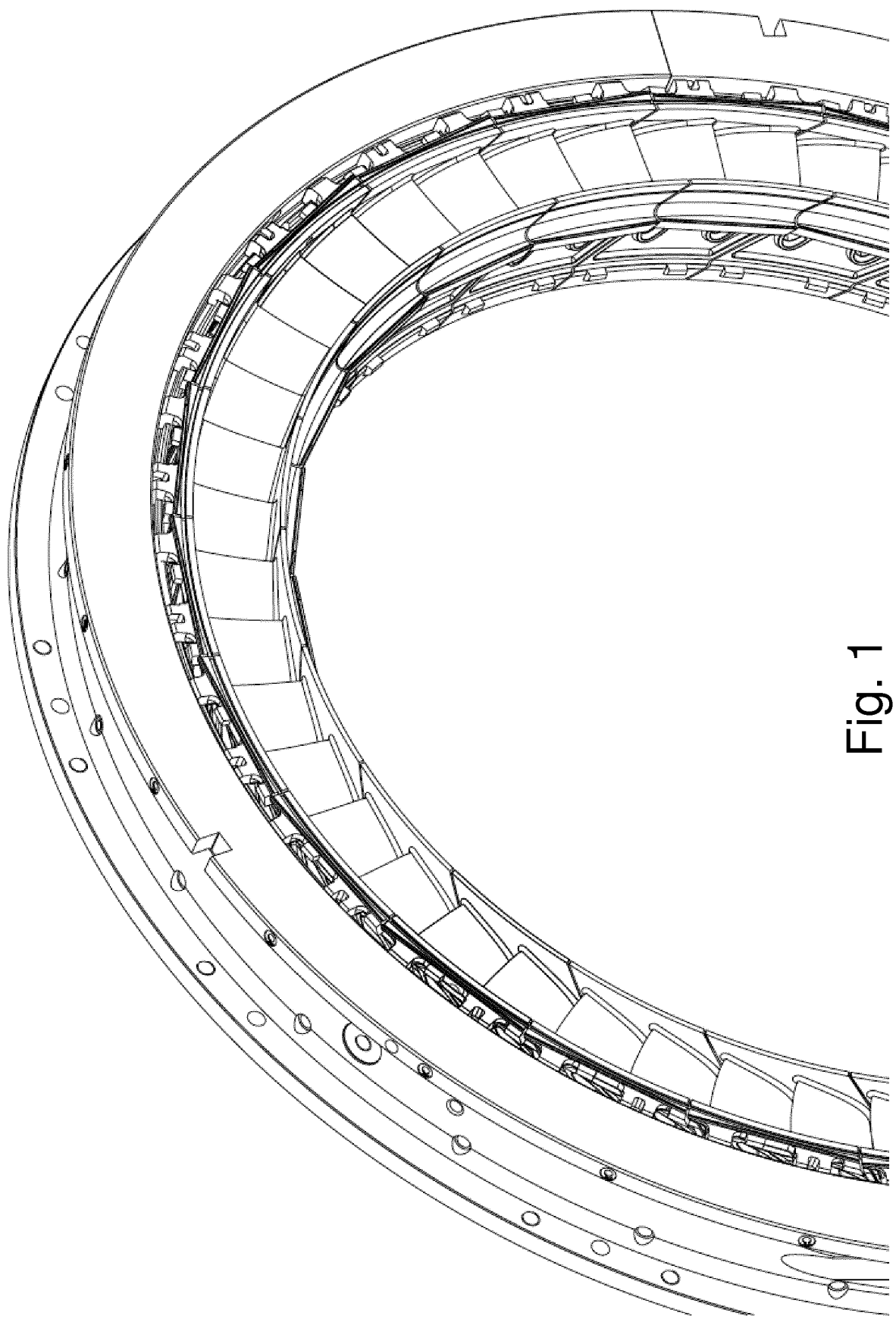
FIG. 1 shows a partial three-dimensional view of the front of a ring-shaped vane assembly (i.e. showing the leading edges of the vanes)

FIG. 1 shows the front of a ring-shaped vane assembly and the leading edges of the vanes may be seen. FIG. 1 is a three-dimensional view.

Figure 2:
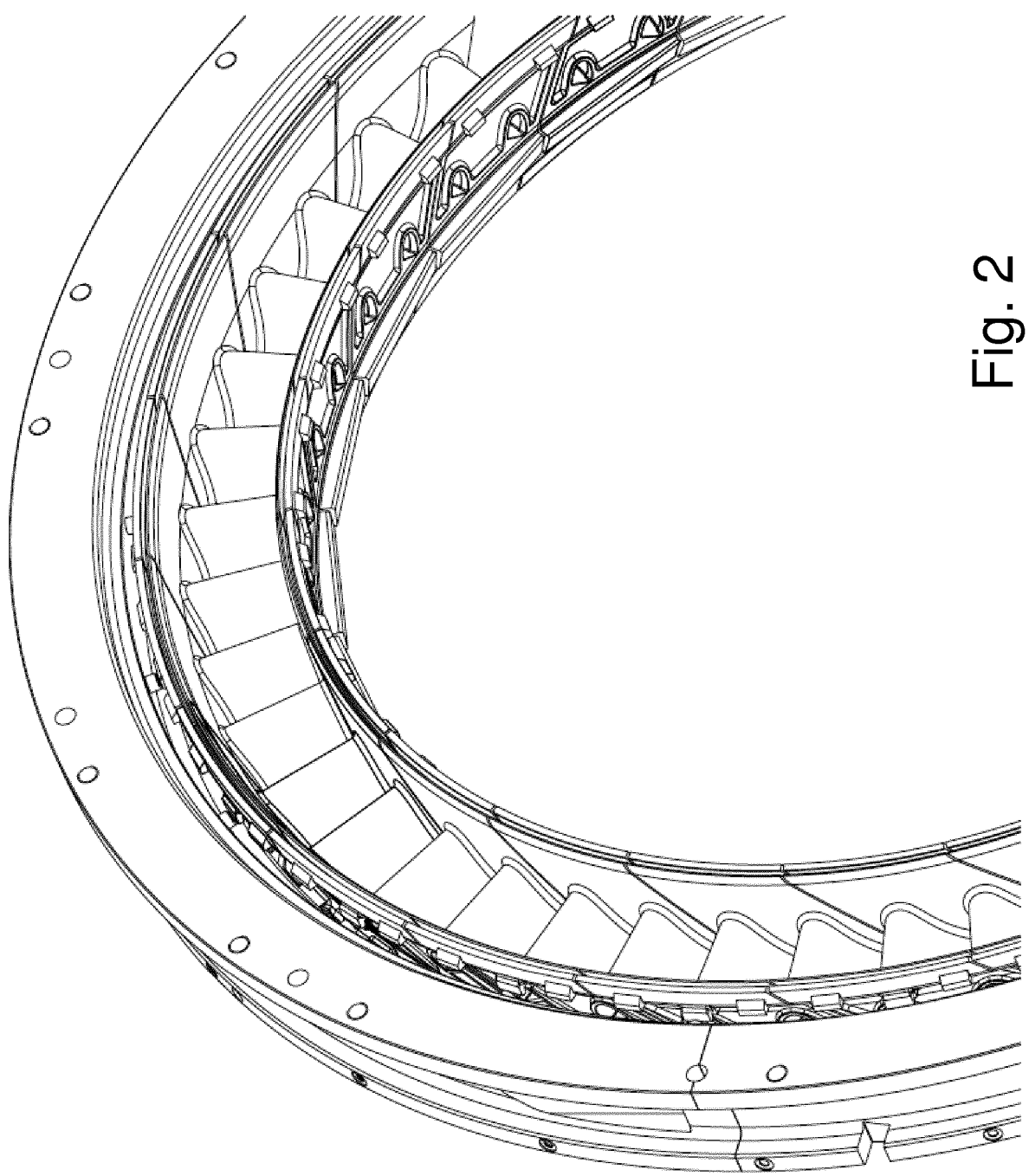
FIG. 2 shows a partial three-dimensional view of the rear of a sector-ring-shaped vane assembly (i.e. showing the trailing edges of the vanes)

FIG. 2 shows the rear of a ring-shaped vane assembly and the trailing edges of the vanes may be seen. FIG. 2 is a three-dimensional view.

Figure 3:
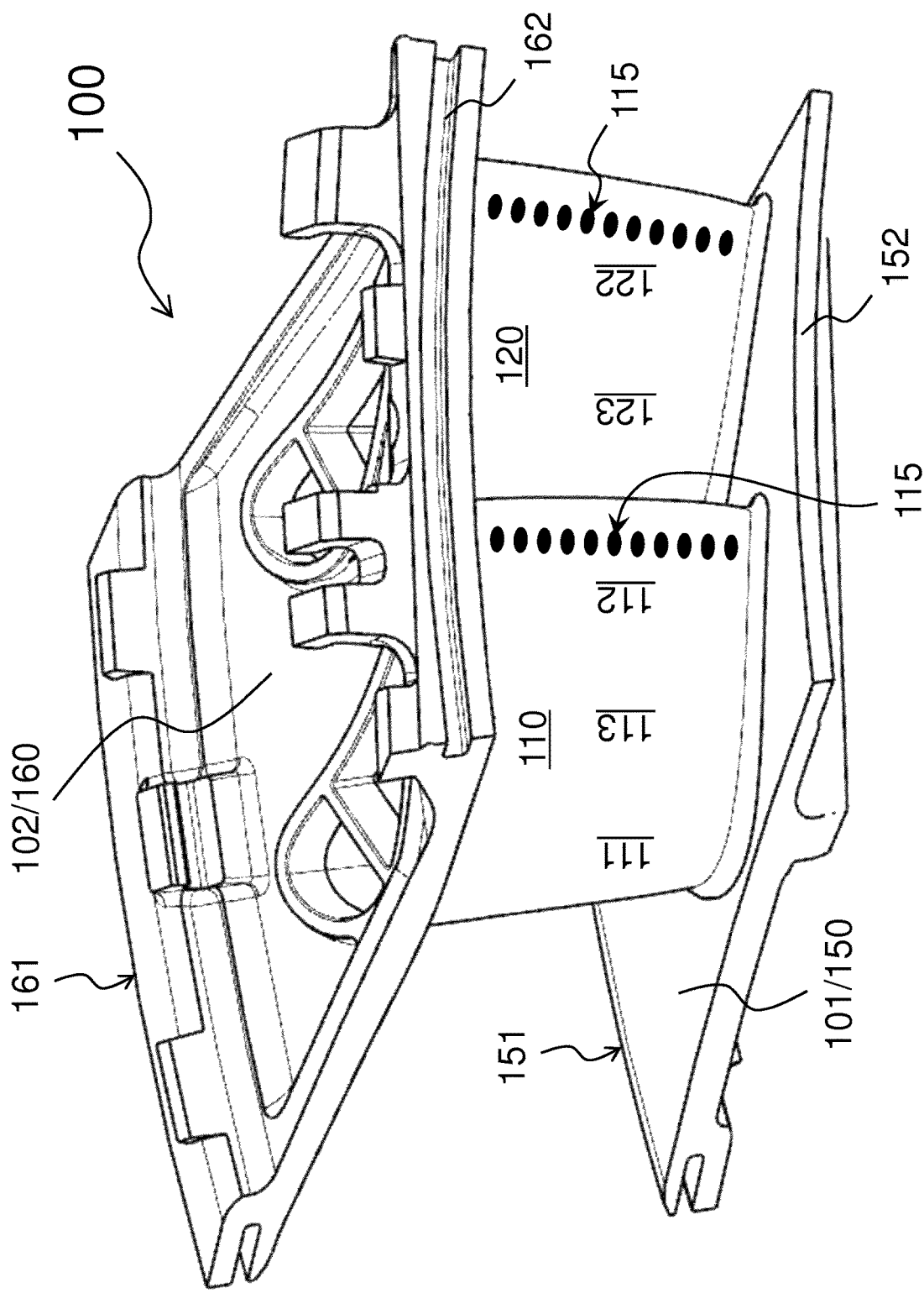
FIG. 3 shows an embodiment of a vane assembly to be repaired.

FIG. 3 shows an embodiment of a vane assembly 100 comprising a first vane 110 and a second vane 120. In the following, it is assumed that vane 110 is damaged even if this does not appear from FIG. 3.

The vane assembly 100 comprises an inner platform 101, an outer platform 102, and the vanes 110 and 120; the words "inner" and "outer" refer to the axis of the turbine (that is not shown in FIG. 3) and mean respectively "closer to the axis" and "farther to the axis". The platform 101 is a sector of a ring 150 and has a front edge 151 and a rear edge 152; the platform 102 is a sector of a ring 160 and has a front edge 161 and a rear edge 162; the words "front" and "rear" refer to the flow of the working fluid inside the turbine (that is not shown in the figure) and mean respectively "closer to the turbine inlet" and "farther to the turbine inlet".

Each of the vanes 110 and 120 consists of a leading edge portion 111 and 121 (not shown in FIG. 3), a trailing edge portion 112 and 122, and a body portion 113 and 123. As can be seen from e.g. FIG. 3 and FIG. 8A, each of the vanes 110 and 120 is hollow and has a set of (e.g. cooling) holes 115 at its trailing edge portion.

Figure 4:
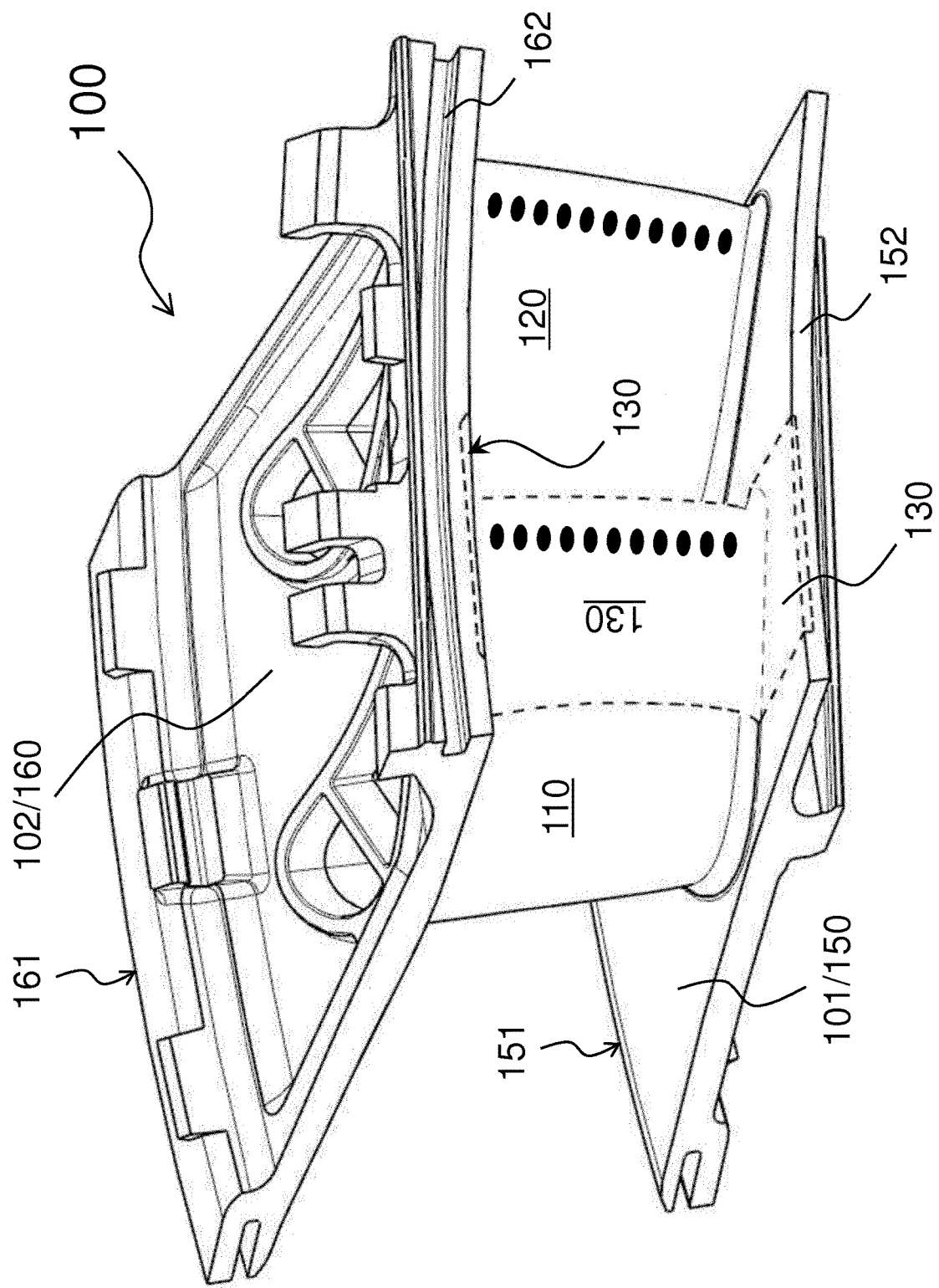
FIG. 4 shows the vane assembly of FIG. 3 wherein one vane region to be removed is highlighted.

FIG. 4 shows the vane assembly of FIG. 3 wherein one vane region of the vane 110 to be removed is highlighted (see dashed lines); the region is to be removed as there damages (not shown either in FIG. 3 or in FIG. 4) in it.

Figure 5:
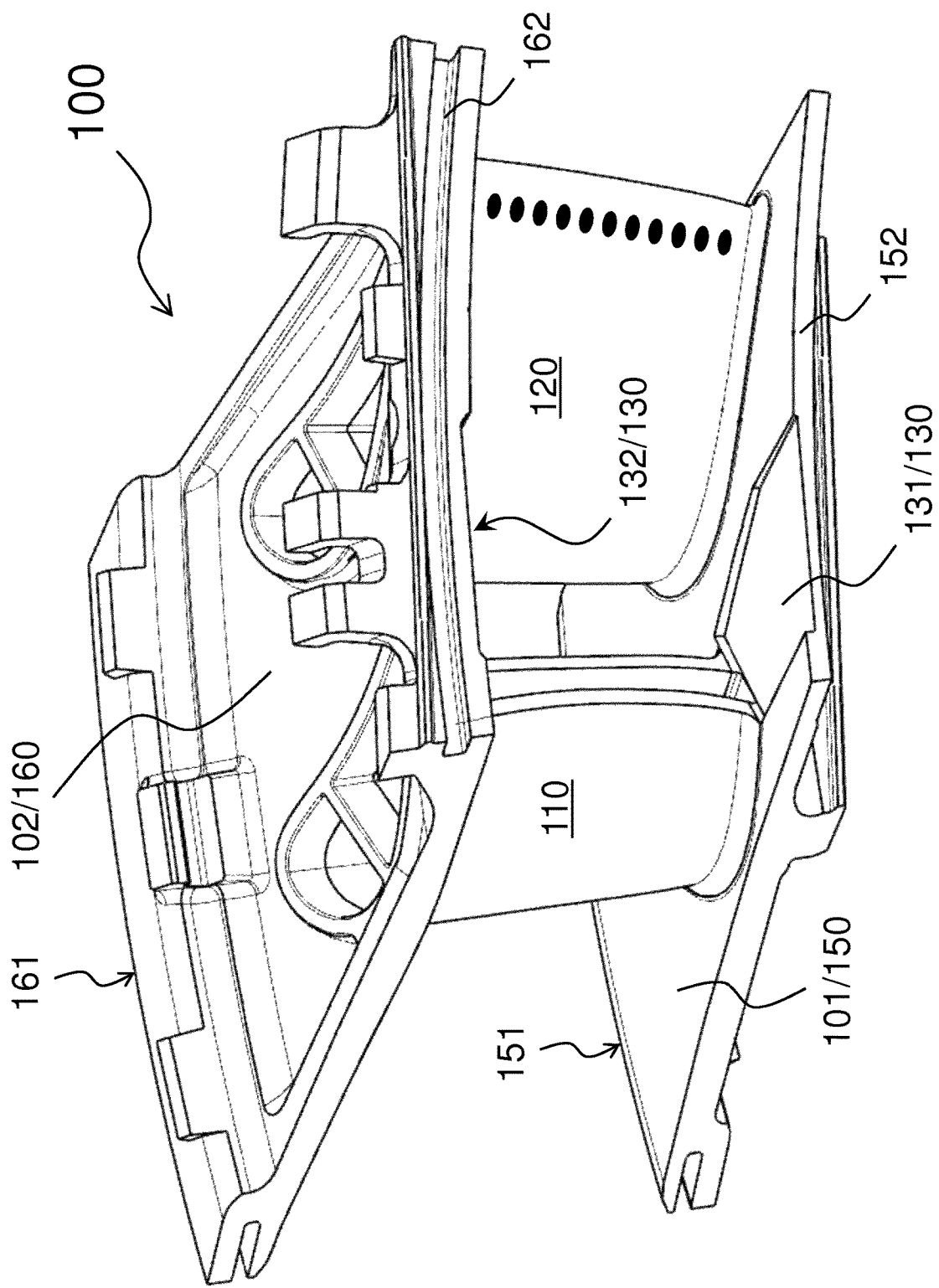
FIG. 5 shows the vane assembly of FIG. 3 wherein one vane region is removed.

FIG. 5 shows the vane assembly 100 of FIG. 3 after removing the vane region of the damaged vane 110 where damages are present. The removed vane region is at the trailing edge of the vane 110, and comprises an inner platform region, an outer platform region and an airfoil region. Reference number 130 in the figures refers to the space occupied by the removed region of the inner platform 101, the removed region of the outer platform 102 and the removed region of the airfoil of the vane 110; as it will be clear in the following, the space occupied by the removed region of the inner platform 101 defines an inner guide 131, and the space occupied by the removed region of the outer platform 102 defines an outer guide 132.

Figure 6:
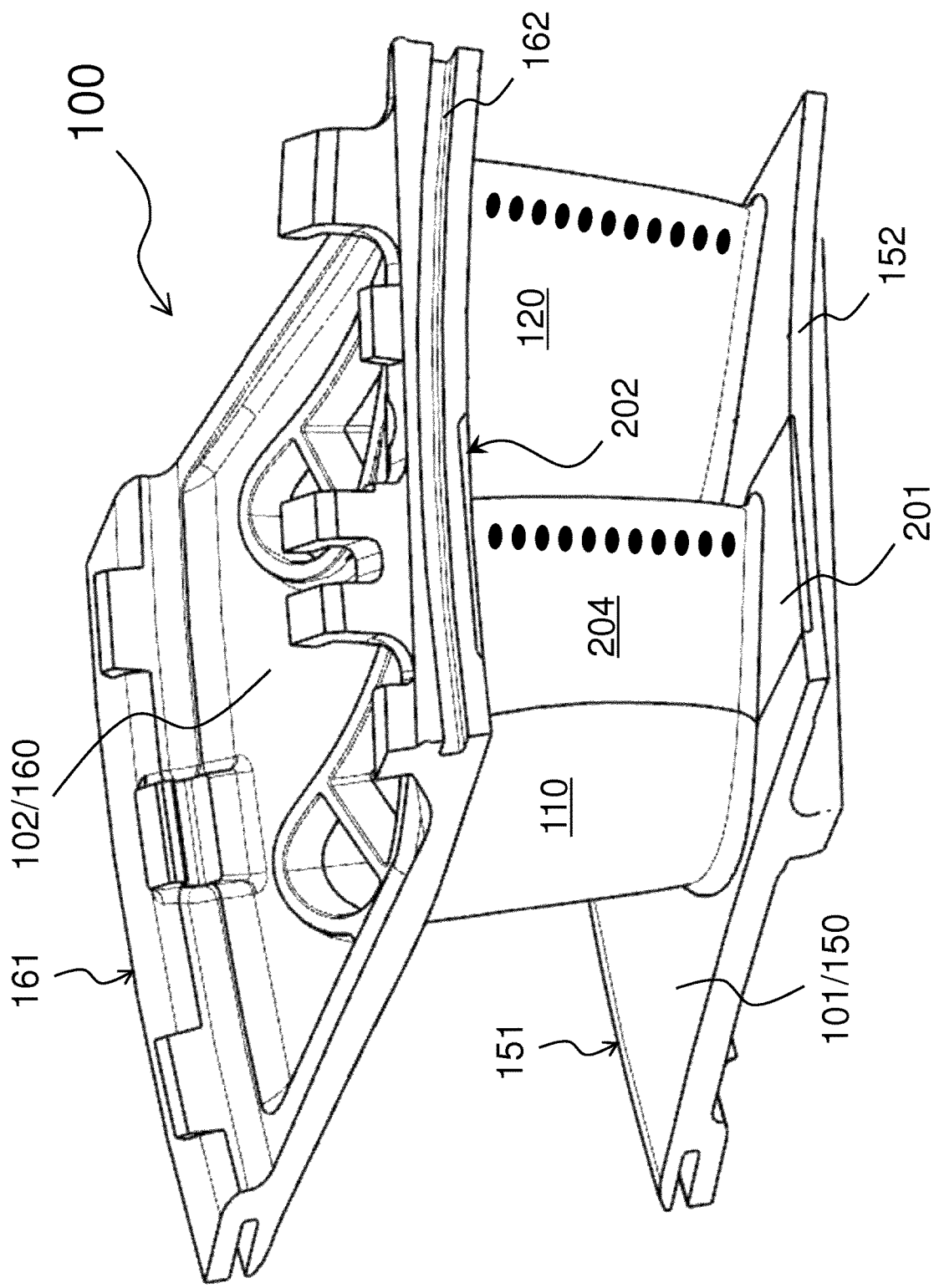
FIG. 6 shows the vane assembly of FIG. 3 wherein one vane region is repaired.

FIG. 6 shows the vane assembly of FIG. 3 wherein one vane region of the vane 110 is repaired through a repair member 200 comprising three portions 201, 202 and 204.

Figure 7:
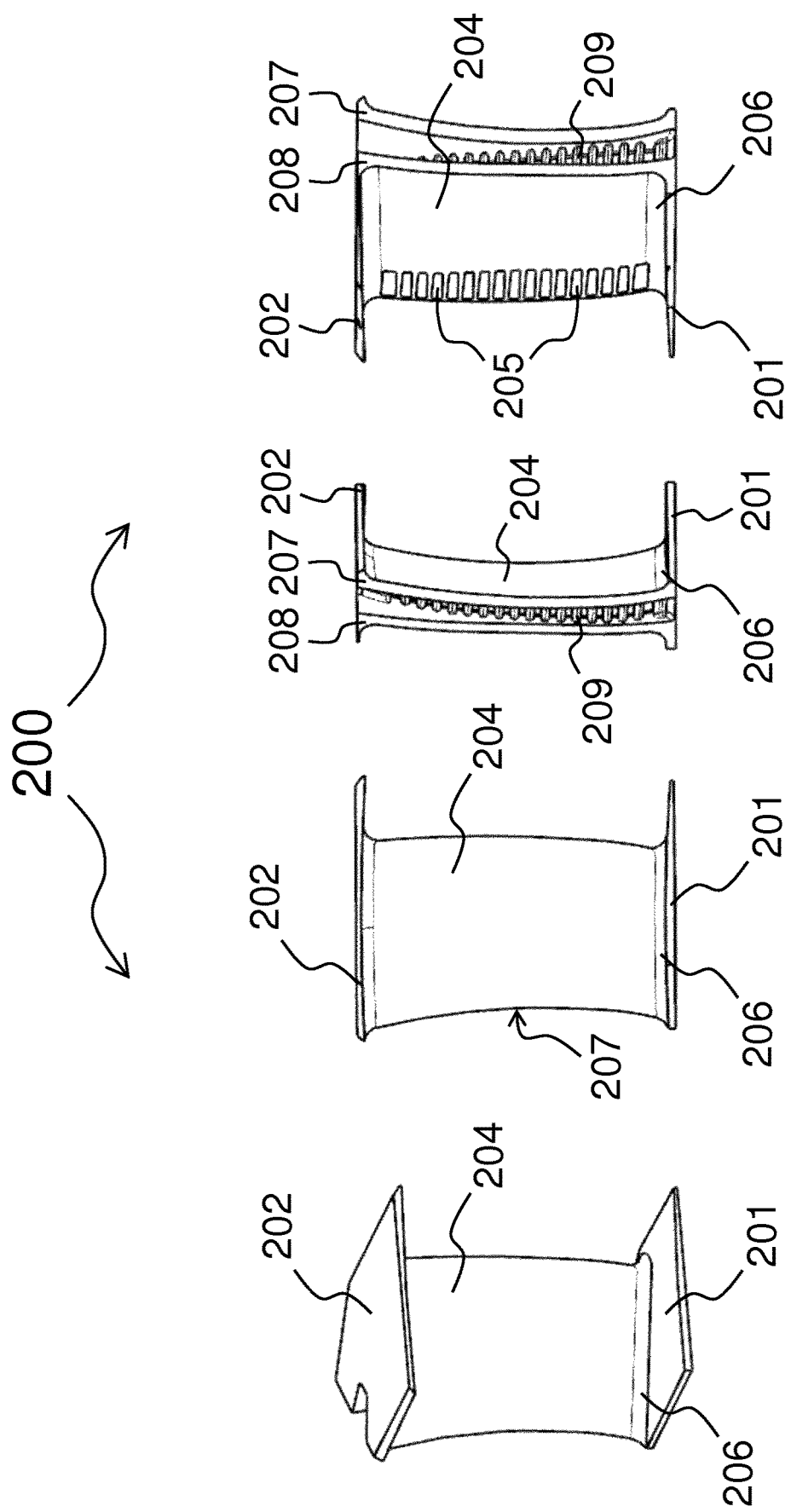
FIG. 7 shows an embodiment of a repair member for repairing the vane assembly of FIG. 3, FIG. 8 comprising FIG. 8A, FIG. 8B

The repair member 200 for repairing the damaged vane 110 is shown in FIG. 7, and some details thereof in FIG. 8. It comprises: an inner platform portion 201 designed to replace part of the inner platform 101 of the damaged vane 110, an outer platform portion 202 designed to replace part of the outer platform 102 of the damaged vane 110, and an airfoil portion 204 connecting the inner and outer platform portions 201 and 202, designed to replace the trailing edge portion 112 of the damaged vane 110. According to alternative embodiments, the airfoil portion of the repair member is designed to replace the leading edge portion of a damaged vane.

The inner platform portion 201 is configured so to reach an edge, in particular the rear edge 152 of the sector of ring 150 (when in repair place), and the outer platform portion 202 is configured so to reach an edge, in particular the rear edge 162 of the sector of ring 160 (when in repair place). This means that the inner platform portion 201 and the outer platform portion 202 comprise portions of (front or rear) edges of vane assembly ring or vane assembly sector of ring.

As can be seen in FIG. 7, the airfoil portion 204 of the repair member 200 has a plurality of holes 205 (see FIG. 8C) on one side very close to its end. Internally, the repair member 200 comprises a plurality of horizontal partitions 209 (see FIG. 8B) located between the holes 205. FIG. 6B is a horizontal cross-section of the airfoil portion 204 passing through a partition 209 and FIG. 6C is a horizontal cross-section of the airfoil portion 204 passing through a (e.g. cooling) hole 205.

Figure 8C:
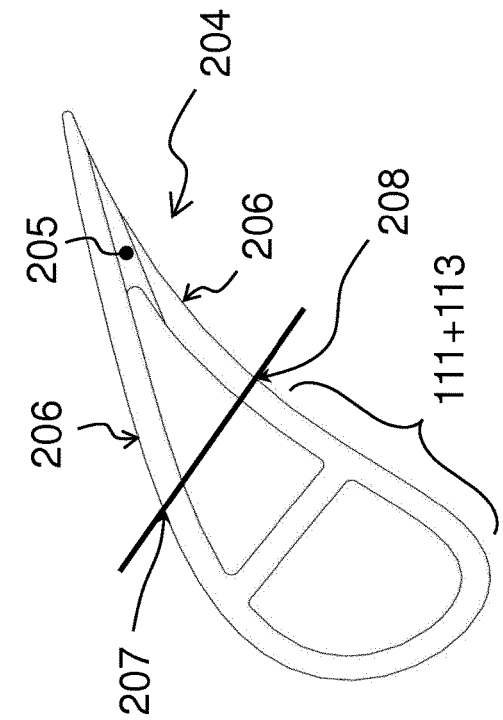
FIG. 8C shows a cross-section view of a vane of an embodiment of a vane assembly to be repaired, and two cross-sections (at two different levels) of an embodiment of a repaired vane of an embodiment of a vane assembly.
Figure 8B:
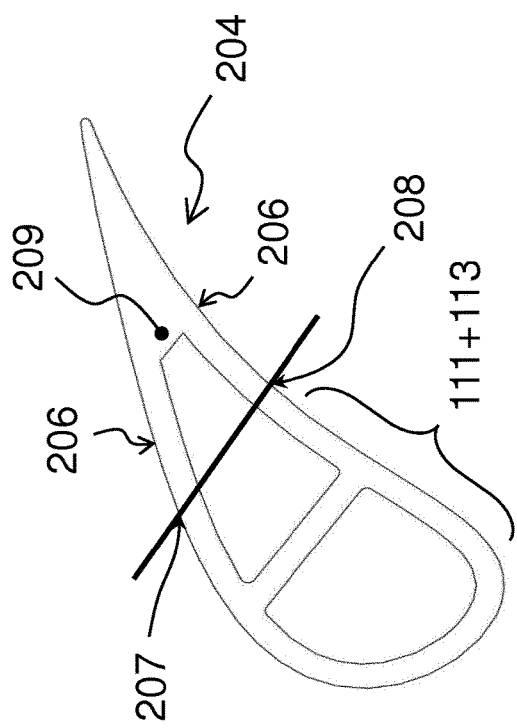
Figure 8A:
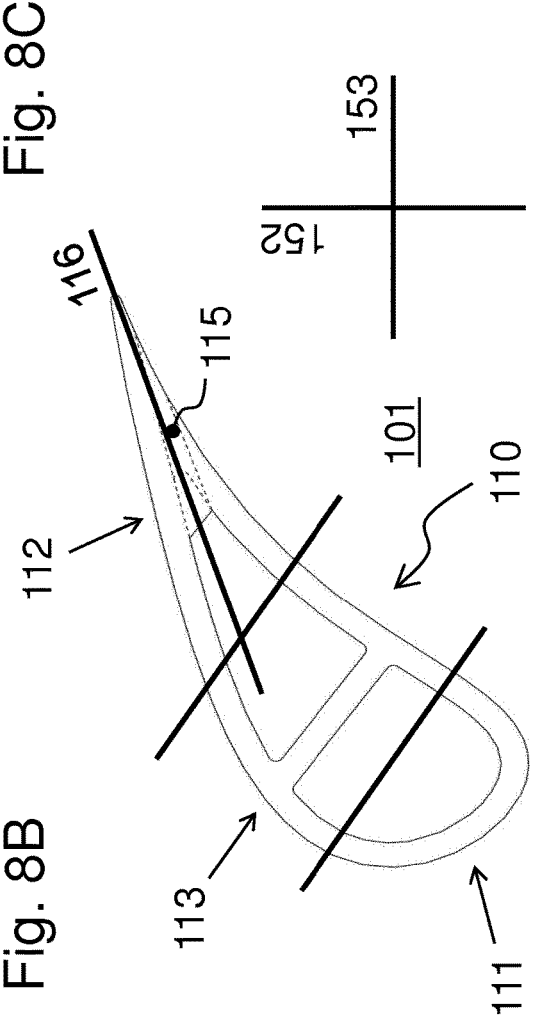

FIG. 8A shows exemplary embodiments of the leading edge portion 111, the trailing edge portion 112 and the body portion 113 of the vane 110; anyway, these three portions does not correspond to separated parts or components of the vane 110 but only to distinct regions of the vane 110. Furthermore, FIG. 8A shows a straight line 116 that almost coincides with the end portion of the camber line of the vane 110, a vertical segment corresponding to the rear edge 152 of the sector of ring 150 and a horizontal segment corresponding to the axis the sector of ring 150.

FIG. 8B and FIG. 8C show the repair member 200 in repair place, i.e. the airfoil portion 204 of the repair member 200 is perfectly adjacent to the body portion 113 of the damaged vane 110.

The inner platform portion 201, the outer platform portion 202, and the airfoil portion 204 are configured so to allow insertion of the repair member 200 into the vane assembly 100 by a pure translation direction movement being along an (more particularly, only one) insertion direction and having a movement component parallel to an axis (see reference number 153 in FIG. 8A) of the sector of ring 150 (that is also parallel to the axis of the sector of ring 160); such direction may be exactly parallel to such axis or may be inclined with respect to it by an angle; such angle may be in the range of e.g. from +20° to −20° or in the range of e.g. +10° to −10°. It is to be noted that, in general, the axis of the ring 150, the axis of the ring 160 and the axis of the gas turbine are parallel.

The inner platform portion 201, the outer platform portion 202, and the airfoil portion 204 are configured so to allow insertion of the repair member 200 into the vane assembly 100 by a pure translation direction movement being along an (more particularly, only one) insertion direction and having a movement component parallel to a camber line (see reference number 116 in FIG. 8A) of the damaged vane 110; such direction may be exactly parallel to the camber line or may be inclined with respect to it by an angle; such angle may be in the range of e.g. from +20° to −20° or in the range of e.g. +10° to −10°.

In an embodiment, the edges 207 and 208 (see FIG. 8C) of the airfoil portion 204 of the repair member 200 is at least at a certain distance from the cooling holes 205 in the airfoil portion 204. Such distance from the cooling holes 205 is, in an embodiment, such that the edges 207 and 208 are 1-4 mm distant from the end of the partitions 209 so that the repair member 200 comprises entirely all the partitions 209.

In an embodiment, one edge, some edges or all the edges of the inner platform portion are at least at a certain distance (for example 1-4 mm) from the fillet between the airfoil portion and the inner platform portion, and one edge, some edges or all the edges of the outer platform portion are at least at a certain distance (for example 1-4 mm) from a fillet between the airfoil portion and the outer platform portion. In this way, the repair member 200 comprises entirely the whole fillet (both inner side and outer side). Considering the embodiment of FIG. 9, the fillet is labelled 206 and the distant edges are labelled 712, 713 and 714 of the inner platform portion 710. Considering the embodiment of FIG. 10, the fillet is labelled 206 and the distant edges are labelled 812, 813, 814 and 815 of the inner platform portion 810. Considering the embodiment of FIG. 11, the fillet is labelled 206 and the distant edges are labelled 912, 913, 914 and 915 of the inner platform portion 910.

Figure 10:
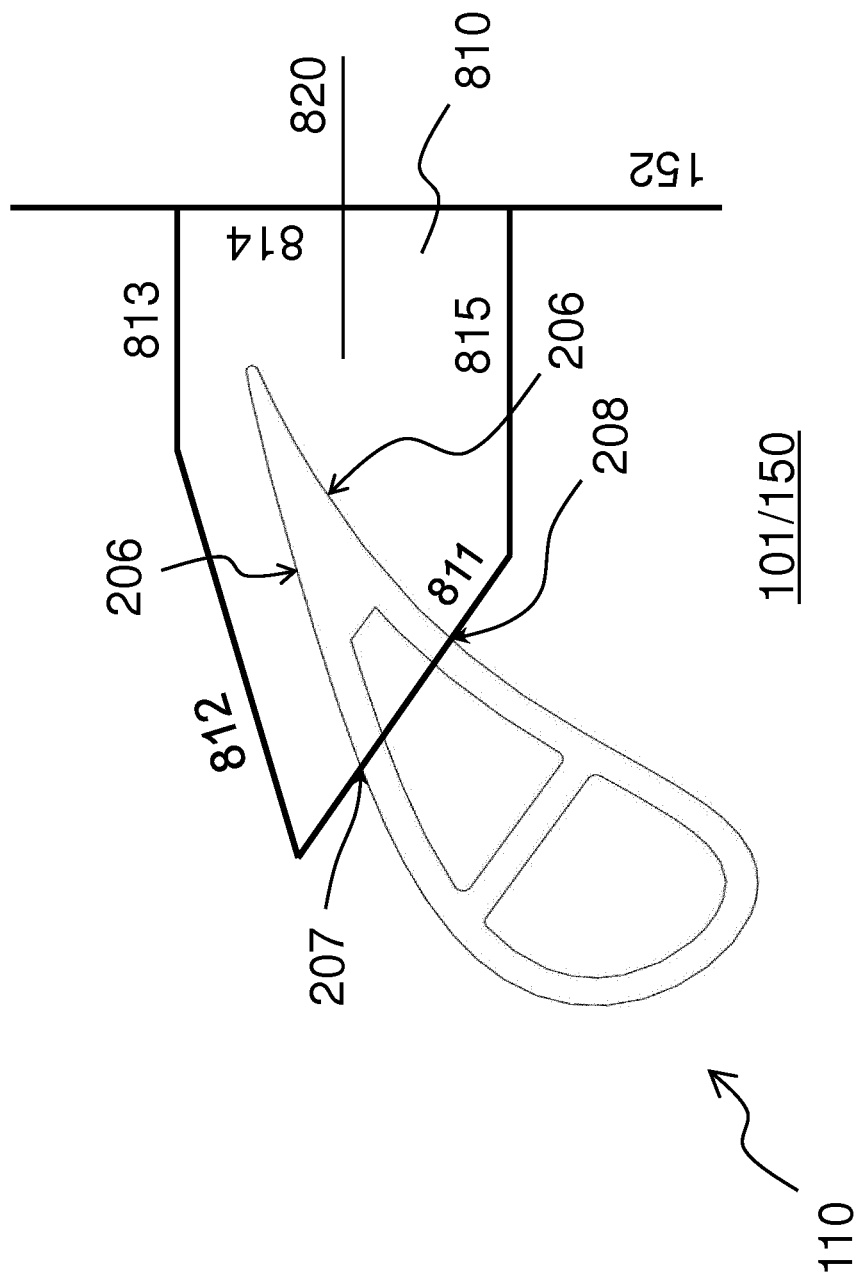
FIG. 10 shows a cross-section view of a second embodiment of a repaired vane.
Figure 11:
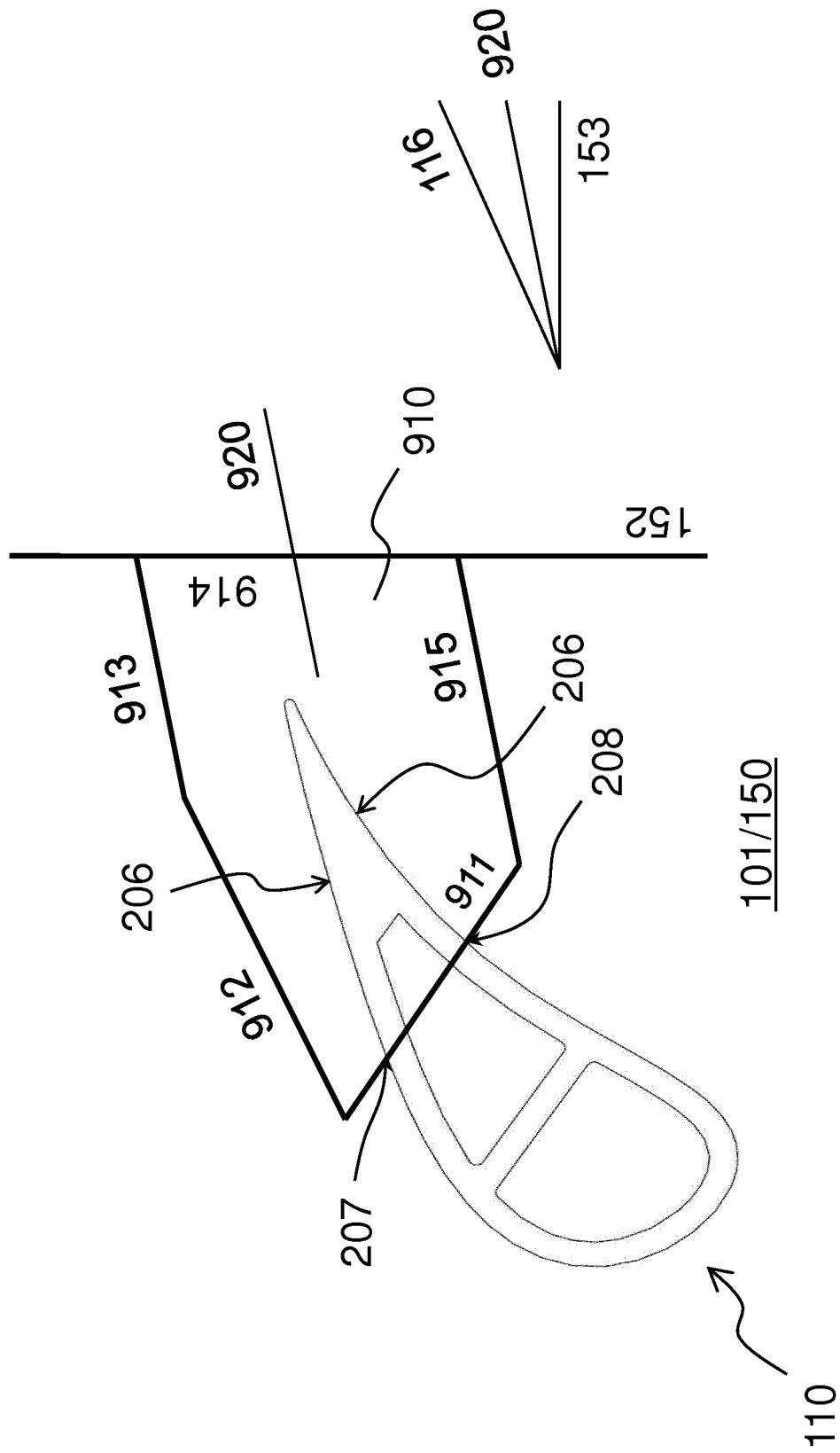
FIG. 11 shows a cross-section view of a third embodiment of a repaired vane.

It is to be noted that in FIG. 9 reference number 711 represents the contact surface between the repair member 200 and the excavated vane assembly 100 with a damaged vane 110, that in FIG. 10 reference number 811 represents the contact surface between the repair member 200 and the excavated vane assembly 100 with a damaged vane 110, in FIG. 11 reference number 911 represents the contact surface between the repair member 200 and the excavated vane assembly 100 with a damaged vane 110.

In general, a method for repairing a damaged vane of a vane assembly comprises:

A) providing a repair member comprising an inner platform portion, an outer platform portion and an airfoil portion connecting the inner and outer platform portions, B) removing from a vane region of the damaged vane material corresponding to the shape of the repair member so to create a space for the repair member, C) inserting the repair member into the space along a certain direction, and D) fixing the repair member to the vane assembly.

In particular:

the inner platform portion of the repair member is designed to replace part of said inner platform of the vane assembly, the outer platform portion of the repair member is designed to replace part of said outer platform of the vane assembly, the airfoil portion of the repair member is designed to replace a leading edge portion or (in an embodiment) a trailing edge portion of the damaged vane of the vane assembly.

According to some embodiments:

a part of the inner platform is removed and an inner guide is created, and a part of the outer platform is removed and an outer guide is created, and the repair member is inserted by sliding the inner platform portion along the inner guide and the outer platform portion along the outer guide;

in particular, the inner guide in the inner platform of the vane assembly has the same shape of the inner platform portion of the repair member, and the outer guide in the outer platform of the vane assembly has the same shape of the outer platform portion of the repair member.

With reference to FIG. 3, FIG. 4 and FIG. 7, the vane assembly is labelled 100, the damaged vane is labelled 110, the repair member is labelled 200, the inner platform portion is labelled 201, the outer platform portion is labelled 202, the airfoil portion is labelled 204, the space of the removed material is labelled 130, the inner guide is labelled 131 and the outer guide is labelled 132.

In general, the above mentioned direction has a component parallel to an axis of the vane assembly. Such axis may be the axis of the sector of the inner and/or outer ring of the vane assembly (these two axes are usually parallel to each other and parallel to the axis of the gas turbine). Such direction may be exactly parallel to such axis or may be inclined with respect to it by an angle; such angle may be in the range of e.g. from +20° to −20° or in the range of e.g. +10° to −10°.

According to the embodiment of FIG. 9, the insertion direction 720 is parallel (in particular coincident) to an end portion 116 of a camber line of the damaged vane 110.

Alternatively, the insertion direction may be perpendicular parallel to a camber line of the damaged vane.

According to the embodiment of FIG. 10, the insertion direction 820 is parallel to the axis 153 of the first sector of ring 150.

According to the embodiment of FIG. 11, the insertion direction 920 at an angle between an end portion 116 of a camber line of the damaged vane 110 and the axis 153 of the first sector of ring 150.

A may be carried out through micro-casting or additive manufacturing.

B may be carried out through electrical discharge machining or milling.

D may be carried out through brazing or welding.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A repair member for repairing a damaged vane of a plurality of vanes of a gas turbine vane assembly, the gas turbine vane assembly further comprising an inner platform in the form of a first ring or sector of ring, the first ring or sector of ring having a first axis, and an outer platform in the form of a second ring or sector of ring, the second ring or sector of ring having a second axis, wherein each vane of the plurality of vanes has a leading edge portion, a trailing edge portion and a body portion, the repair member comprising:
    an inner platform portion designed to replace part of the inner platform of the damaged vane,
    an outer platform portion designed to replace part of the outer platform of the damaged vane, and
    an airfoil portion connecting the inner and outer platform portions, designed to replace a leading edge portion or a trailing edge portion of the damaged vane;
wherein the inner platform portion is configured so to reach an edge of the first ring or sector of ring,
wherein the outer platform portion is configured so to reach an edge of the second ring or sector of ring, and
wherein the inner platform portion, the outer platform portion, and the airfoil portion are collectively configured to enable insertion of the repair member into the vane assembly by only a sliding movement in a direction parallel to the first axis and the second axis.

2. The repair member of claim 1, wherein the airfoil portion is designed to replace a trailing edge portion of the damaged vane, the inner platform portion is configured so to reach a rear edge of the first ring or sector of ring, and the outer platform portion is configured to reach a rear edge of the second ring or sector of ring.

3. The repair member of claim 1, wherein the direction is also parallel to a camber line of the damaged vane.

4. The repair member of claim 1, wherein an edge of the inner platform portion is a distance from a first fillet between the airfoil portion and the inner platform portion, and an edge of the outer platform portion is a distance from a second fillet between the airfoil portion and the outer platform portion.

5. The repair member of claim 1, wherein the airfoil portion comprises cooling holes and an edge of the airfoil portion is a distance from the cooling holes.

6. A method for repairing a damaged vane of a plurality of vanes of a gas turbine vane assembly, the vane assembly further comprising an inner platform in the form of a first ring or sector of ring, the first ring or sector of ring having a first axis, and an outer platform in the form of a second ring or sector of ring, the second ring or sector of ring having a second axis, wherein each vane of the plurality of vanes has a leading edge portion, a trailing edge portion and a body portion, the method comprising:
    A) using a repair member comprising an inner platform portion, an outer platform portion and an airfoil portion connecting the inner and outer platform portions;
    B) removing from a vane region of said damaged vane of the plurality of vanes material corresponding to the shape of the repair member so to create a space for the repair member;
    C) inserting the repair member into the space by only having to slide the repair member in a direction parallel to the first axis and the second axis; and
    D) fixing the repair member to the vane assembly,
    wherein in step B a part of the inner platform is removed and an inner guide is created, and a part of the outer platform is removed and an outer guide is created, and
    wherein in step C the repair member is inserted by sliding the inner platform portion along the inner guide and the outer platform portion along the outer guide.

7. The method of claim 6, wherein the direction is also parallel to a camber line of the damaged vane.

8. The method of claim 6, wherein the direction is also perpendicular to a camber line of the damaged vane.

9. The method of claim 6, wherein step A is carried out through micro-casting or additive manufacturing.

10. The method of claim 6, wherein step B is carried out through electrical discharge machining or milling.

11. The method of claim 6, wherein step D is carried out through brazing or welding.

* * * * *